US009551268B2

United States Patent
Wang et al.

(10) Patent No.: US 9,551,268 B2
(45) Date of Patent: Jan. 24, 2017

(54) COOLING AIR INTAKE DEVICE FOR VEHICLE

(71) Applicant: KWANG YANG MOTOR CO., LTD., Kaohsiung (TW)

(72) Inventors: Jun-Kai Wang, Kaohsiung (TW); Wen-Ming Su, Kaohsiung (TW); Chi-Han Chang, Kaohsiung (TW)

(73) Assignee: KWANG YANG MOTOR CO., LTD., Kaohsiung (TW)

( * ) Notice: Subject to any disclaimer, the term of this patent is extended or adjusted under 35 U.S.C. 154(b) by 974 days.

(21) Appl. No.: 13/851,104

(22) Filed: Mar. 27, 2013

(65) Prior Publication Data

US 2013/0309955 A1 Nov. 21, 2013

(30) Foreign Application Priority Data

May 15, 2012 (TW) .............................. 101209149 U

(51) Int. Cl.
| | |
|---|---|
| B60K 11/06 | (2006.01) |
| F01P 1/08 | (2006.01) |
| F01P 1/00 | (2006.01) |

(52) U.S. Cl.
CPC .................. *F01P 1/08* (2013.01); *B60K 11/06* (2013.01); *F01P 2001/005* (2013.01)

(58) Field of Classification Search
CPC ......... B60K 11/00; B60K 11/06; B60K 11/08; F01P 1/06; F01P 1/08; F01P 2001/005
See application file for complete search history.

(56) References Cited

U.S. PATENT DOCUMENTS

| | | | | |
|---|---|---|---|---|
| 2,220,308 A | * | 11/1940 | Whitman | F01P 1/06 123/198 R |
| 3,203,476 A | * | 8/1965 | McMahan | F01P 1/06 165/42 |
| 4,606,422 A | * | 8/1986 | Jewett | B60K 11/08 180/68.1 |
| 5,515,816 A | * | 5/1996 | Ball | F01P 1/02 123/195 C |
| 7,562,739 B2 | * | 7/2009 | Lan | B62K 5/01 180/339 |
| 2003/0066696 A1 | * | 4/2003 | Nakamura | B62K 5/01 180/68.1 |
| 2013/0087396 A1 | * | 4/2013 | Itoo | B60K 11/08 180/68.3 |

FOREIGN PATENT DOCUMENTS

| | | | | |
|---|---|---|---|---|
| DE | 4017408 A1 | * | 12/1990 | ............. B60K 11/06 |
| JP | WO 2010021292 A1 | * | 2/2010 | ............... B60K 1/04 |

* cited by examiner

*Primary Examiner* — Frank Vanaman
(74) *Attorney, Agent, or Firm* — Leong C. Lei

(57) ABSTRACT

A cooling air intake device is mounted to a frame of a vehicle and includes a base plate and an intake box. The intake box is mounted on the base plate that includes a first admission section and a blocking section adjacent to the first admission section. The intake box includes a first intake compartment and a second intake compartment. The first intake compartment corresponds to the first admission section of the base plate. The first intake compartment includes a first baffle plate mounted therein. The first intake compartment has a side wall in which a first discharge section is formed. The second intake compartment is arranged above the first intake compartment in such a way that a second baffle plate is arranged between the first intake compartment and the second intake compartment. The second intake compartment includes a second admission section and a second discharge section.

10 Claims, 5 Drawing Sheets

COOLING AIR INTAKE DEVICE FOR VEHICLE

TECHNICAL FIELD OF THE INVENTION

The present invention generally relates to a cooling air intake device for vehicle, and more particularly to a structure of cooling air intake device that enhances the operation performance of the cooling air intake device.

DESCRIPTION OF THE PRIOR ART

A conventional vehicle 1, as shown in FIG. 1, comprises a frame 11 on which an engine 12 is suspended. The engine 12 is provided with a transmission 2 adjacent thereto. The transmission 2 comprises a continuous variable transmission system (not shown) arranged therein.

The transmission 2 comprises an air ingress conduit 21 for drawing in cooling air and an air egress conduit 22. External air that is used to cool the continuous variable transmission system of the transmission 2 flows through the air ingress conduit 21 into the transmission 2 to cool the components/parts of the continuous variable transmission system. The air that is heated in this process is discharged to the outside through the air egress conduit 22. As such, the continuous variable transmission system is protected from damage caused by over-heating of high temperature.

To make the external cooling air that enters the transmission 2 clean cooling air, manufacturers of this industry often provide a cooling air intake device 23 at a front end of the air ingress conduit 21. The cooling air intake device 23 is generally a box having an air inlet opening 231 and an air outlet opening 232. The front end of the air ingress conduit 21 is connected to the air outlet opening 232 of the cooling air intake device 23 so that the cooling air intake device 23 may function to block external dust and moisture thereby making the cooling air that is drawn into the transmission 2 clean and protecting components/parts of the continuous variable transmission system of the transmission 2 from damage caused by the dust and/or moisture entraining the cooling air.

The conventional cooling air intake device 23 described above comprises only a single air inlet opening 231 and a single air outlet opening 232. It is apparent that the cooling air intake device 23 can only effect cooling for a single component/sub-assembly of the engine 12. This imposes extreme limitation to the operation performance of the cooling air intake device 23. Thus, it is a major issue to be addressed in the industry of vehicle manufacturing to provide a structure of cooling air intake device that enhances the operation performance of the cooling air intake device.

SUMMARY OF THE INVENTION

In view of the drawback of poor performance of the conventional cooling air intake device, the primary object of the present invention is to provide a cooling air intake device of vehicle. The cooling air intake device is mounted on a frame of the vehicle. The cooling air intake device comprises a base plate and the intake box. The base plate comprises an intake box mounting section. The intake box mounting section has a lower portion in which a first admission section is formed. Further, the base plate comprises a blocking section extending along a circumferential flange of the intake box mounting section. The intake box is fixed to the intake box mounting section of the base plate.

The intake box comprises a first intake compartment and a second intake compartment. The first intake compartment is arranged to correspond to the first admission section of the base plate. The first intake compartment comprises a first baffle plate mounted therein. The first intake compartment has a side wall in which a first discharge section is formed. The second intake compartment is arranged above the first intake compartment in such a way that a second baffle plate is arranged between the first intake compartment and the second intake compartment. The second baffle plate comprises a drain opening formed therein. The second intake compartment comprises a second admission section and a second discharge section.

The efficacy that the present invention can provide by means of the above technical solution is that by providing a cooling air intake device with a first intake compartment and a second intake compartment, heat dissipation and cooling can be performed simultaneously on at least two components/sub-assemblies of a vehicle so as to enhance the operation performance of the cooling air intake device.

Another object of the present invention is to provide a cooling air intake device of the vehicle, wherein by providing a blocking section along a circumferential flange of a base plate of the cooling air intake device, when viewed in a direction from the rear side of the vehicle toward the head side, the cooling air intake device can completely shields the generator so that ground dust and water that are lifted by a rear wheel of the vehicle can be completely blocked by the cooling air intake device and are not splashed to the generator.

The efficacy that the present invention can provide by means of the above technical solution is that ground dust and water that are lifted by a rear wheel of the vehicle can be completely blocked by the cooling air intake device and are not splashed to the generator thereby protecting the generator from being stained and damaged by the dust and water lifted by the rear wheel. As such, malfunctioning of the generator caused by staining and damage by dust and water can be prevented.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figures 1, 1A:
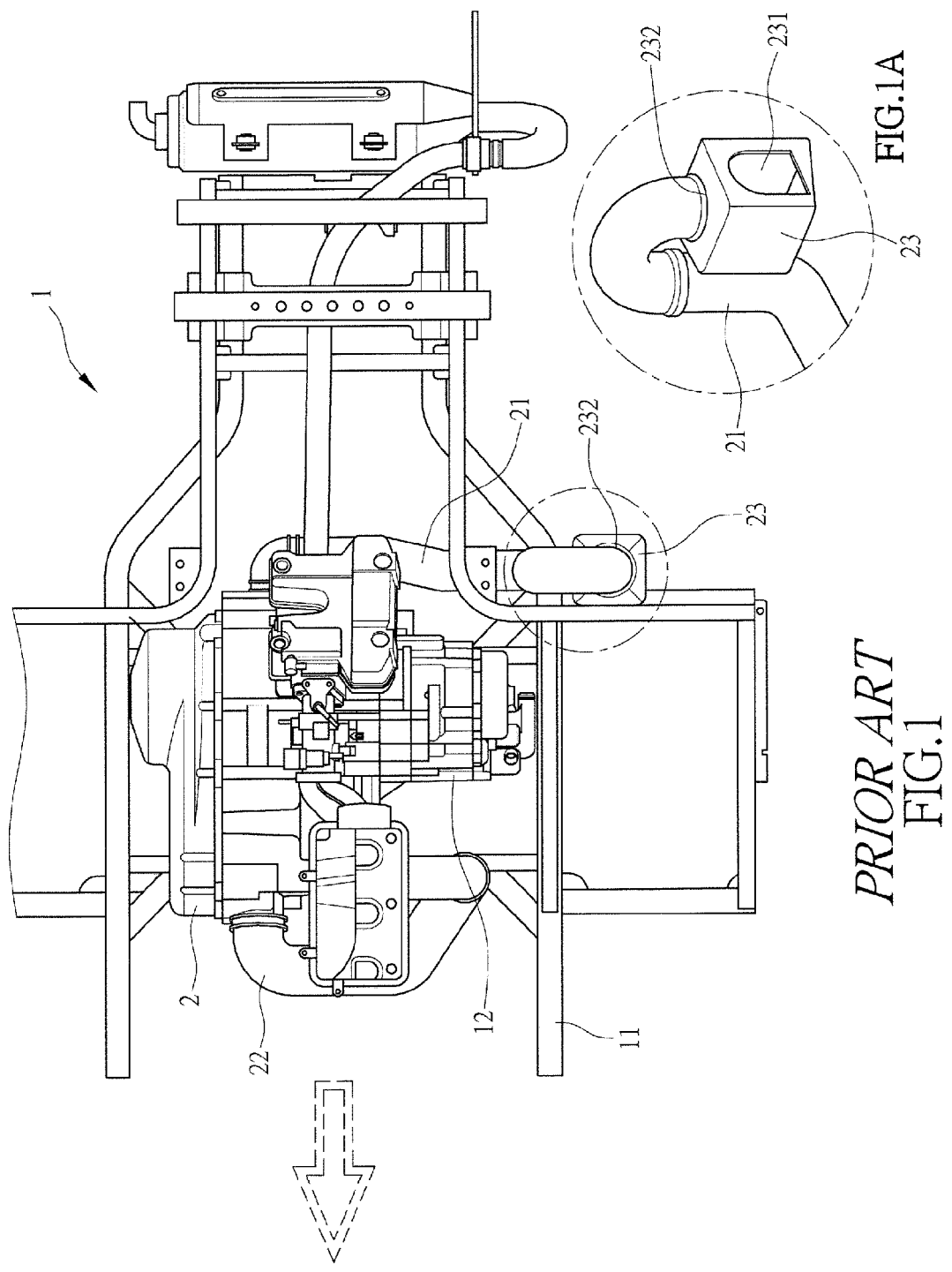
FIG. 1 is a schematic view showing a conventional arrangement of vehicle engine.
FIG. 1A is an enlarged view of a circled portion of FIG. 1.
Figure 2:
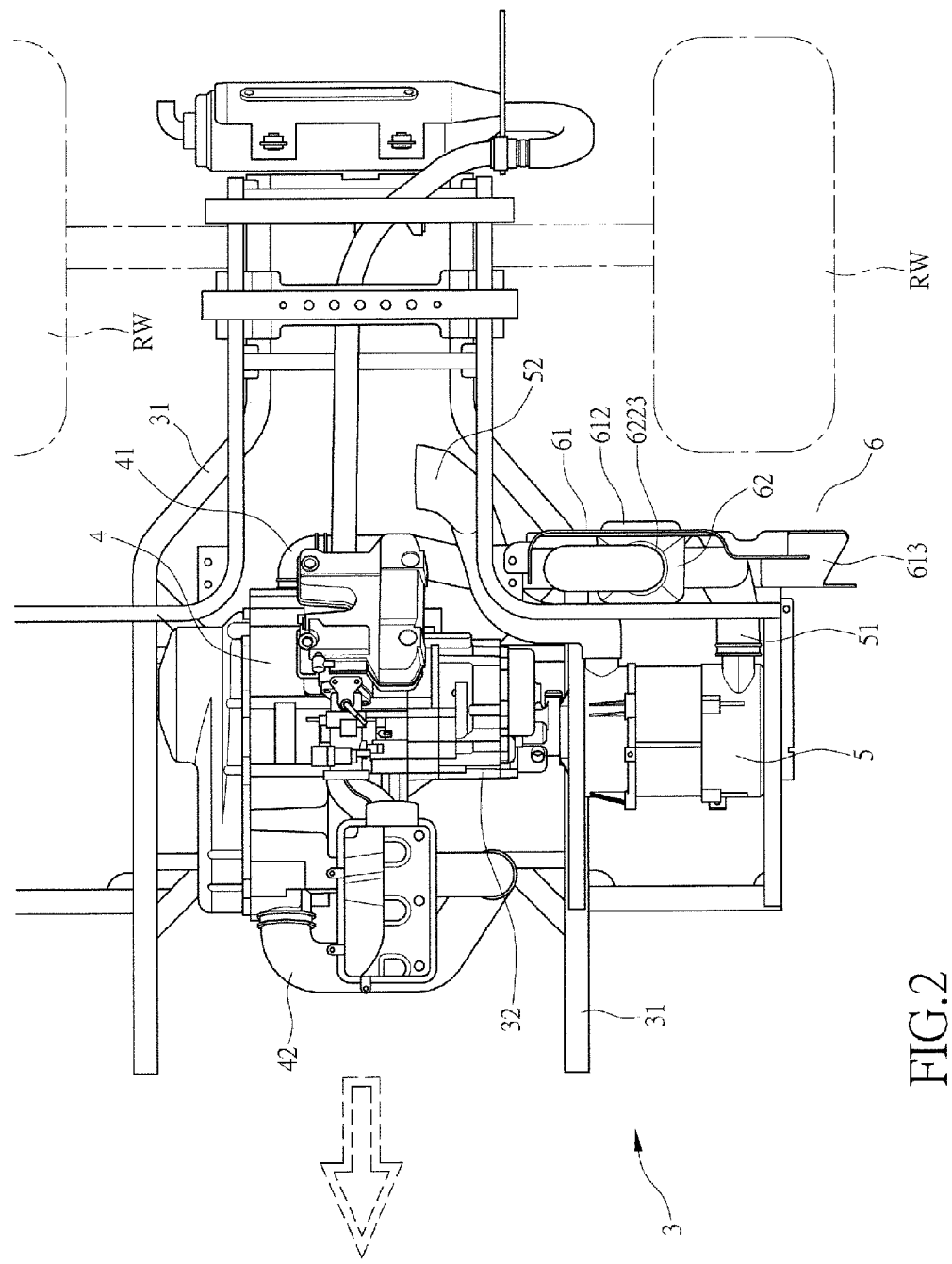
FIG. 2 is a schematic view showing an arrangement of vehicle engine according to the present invention.

Referring first to FIG. 2, in which the arrow indicates the head direction of a vehicle 3, the vehicle 3 according to the present invention comprises a frame 31 on which an engine 32 is mounted. The engine 32 is provided with a transmission 4. The transmission 4 comprises therein a continuous variable transmission system (not shown). Further, the frame 31 is provided with a generator 5 located beside the engine 32. The generator 5 is driven by the engine 32.

The transmission 4 is provided, at a front side thereof, with a transmission cooling air ingress conduit 41 and is also provided, at a rear side thereof, with a transmission cooling air egress conduit 42. External cooling air that can cool down the continuous variable transmission system of the transmission 4 is introduced through the transmission cooling air ingress conduit 41 to get into the transmission 4 to carry out cooling operation on the continuous variable transmission system. The air, after the cooling operation, is discharged through the transmission cooling air egress conduit 42 on the front side of the transmission 4. In this way, the continuous variable transmission system contained in the transmission 4 is protected against damage caused by high temperature. The generator 5 is provided, at a rear side thereof, with a generator cooling air ingress conduit 51 and is also provided, at a rear side thereof, with an air egress conduit 52, whereby cooling air for cooling the generator 5 is introduced through the generator cooling air ingress conduit 51 into the generator 5 to carry out a cooling operation. The air, after the cooling operation, is discharged through the generator cooling air egress conduit 52 so as to protect the generator 5 from being damaged by the high temperature generated in the operation thereof. To make the cooling air that cools the transmission 4 and the generator 5 clean cooling air, the transmission cooling air ingress conduit 41 of the transmission 4 and the generator cooling air ingress conduit 51 of the generator 5 are connected to a cooling air intake device 6.

Figure 3:
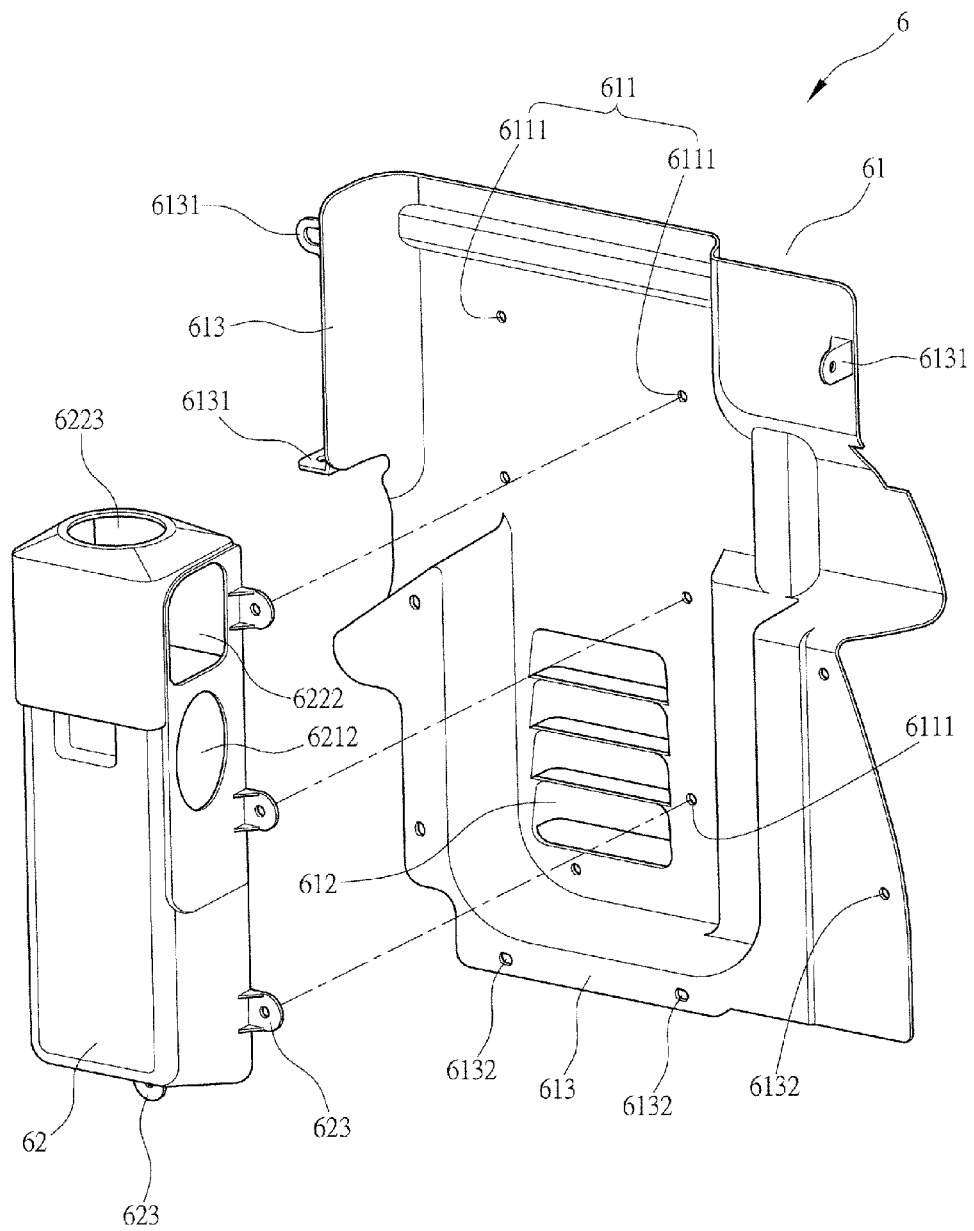
FIG. 3 is an exploded view showing a cooling air intake device according to the present invention.
Figure 4:
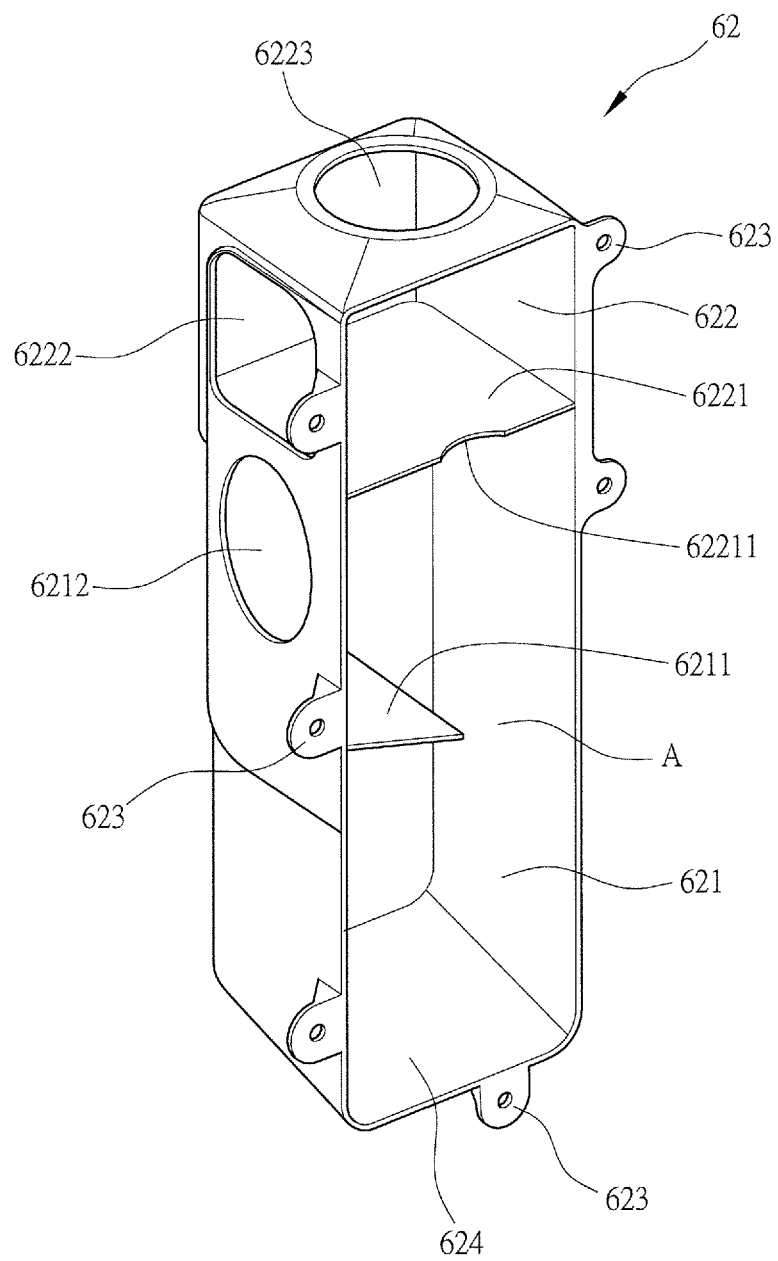
FIG. 4 is a perspective view showing an intake box of the cooling air intake device according to the present invention.
Figure 5:
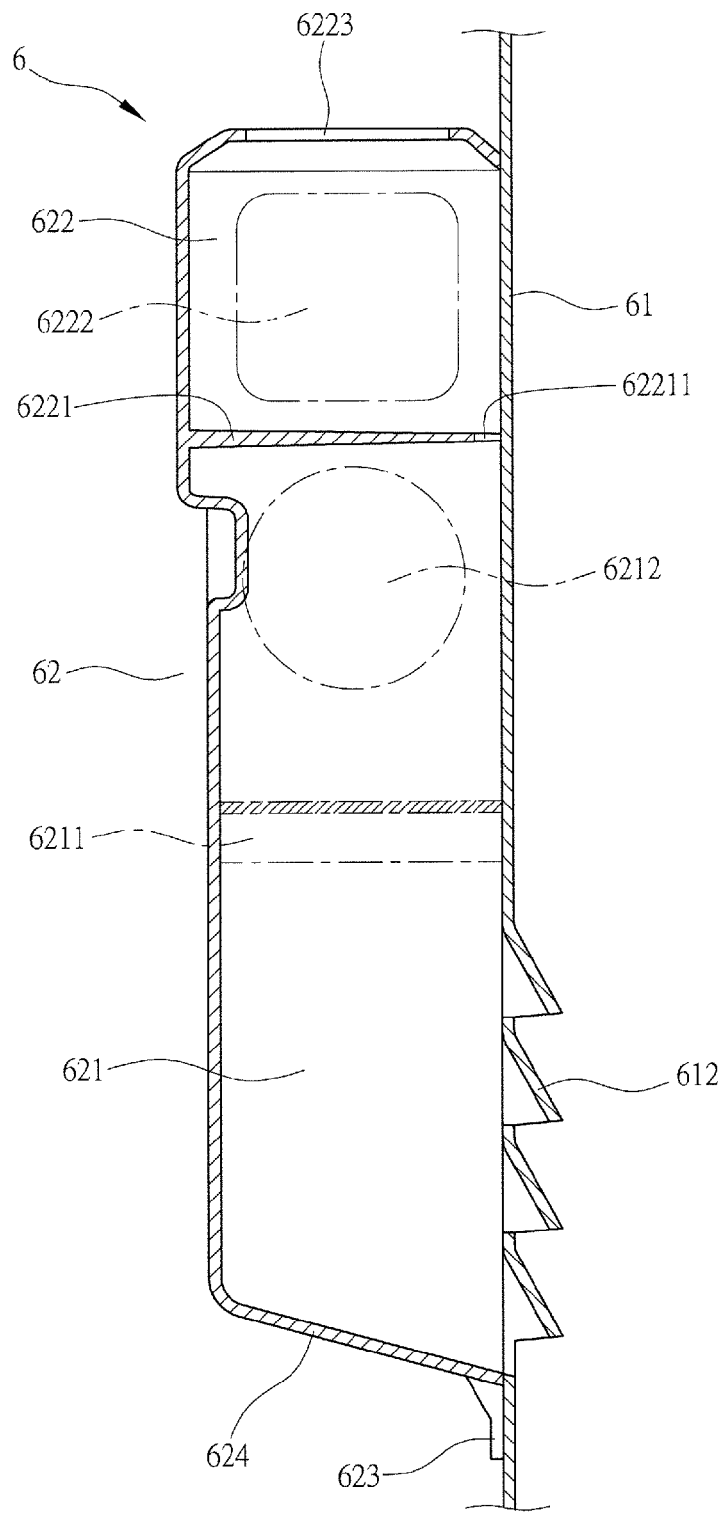
FIG. 5 is a cross-sectional view of the cooling air intake device according to the present invention.

Next, referring to FIGS. 3 and 4, the cooling air intake device 6 comprises a base plate 61 and an intake box 62.

The base plate 61 comprises an intake box mounting section 611. The intake box mounting section 611 has a circumferential flange in which a plurality of mounting holes 6111 is formed. Further, a first admission section 612 is formed in a lower portion of the intake box mounting section 611 and the first admission section 612 comprises a plurality of horizontally-extending openings that is distributed in a vertical direction in a mutually-spaced manner. The base plate 61 comprises a blocking section 613 extending along the circumferential flange of the intake box mounting section 61. The blocking section 613 comprises mounting lugs 6131 and mounting holes 6132 formed thereon so that the base plate 61 is mounted to the vehicle frame 31 by the mounting lugs 6131 and the mounting holes 6132 of the blocking section 613.

The intake box 62 comprises a first intake compartment 621 and a second intake compartment 622. The first intake compartment 621 is arranged to correspond to the first admission section 612 of the base plate 61. The first intake compartment 621 comprises a first baffle plate 6211 mounted therein. The first baffle plate 6211 is mounted in a downward inclined manner and the first baffle plate 6211 forms at least a spacing distance with respect to an inside wall of the intake box 62 so that the spacing distance defines a channel A. Further, the first intake compartment 621 comprises a side wall in which a first discharge section 6212 is formed. The second intake compartment 622 is arranged above the first intake compartment 621 in such a way that a second baffle plate 6221 is provided between the first intake compartment 621 and the second intake compartment 622. The second baffle plate 6221 comprises a drain opening 62211 formed therein and the drain opening 62211 is formed with a curved notch. Further, the second intake compartment 622 comprises a second admission section 6222 and a second discharge section 6223. The intake box 62 comprises a plurality of securing lugs 623 formed along outer edges facing the base plate 61. The securing lugs 623 are arranged to correspond and oppose the mounting holes 6111 of the base plate 61, whereby the intake box 62 can be secured to the intake box mounting section 611 of the base plate 61. The first intake compartment 621 of the intake box 62 has a bottom 624 that is arranged in an inclined manner.

To practice the present invention, as shown in FIGS. 2 and 3, the cooling air intake device 6 is first mounted to and positioned on the vehicle frame 31 at a location beside the generator 5 by the mounting lugs 6131 and the mounting holes 6132 of the blocking section 613. More specifically, the cooling air intake device 6 is mounted and positioned between the generator 5 and a rear wheel RW. The transmission cooling air ingress conduit 41 of the transmission 4 is then connected to the second discharge section 6223 of the second intake compartment 622 of the cooling air intake device 6 and the generator cooling air ingress conduit 51 of the generator 5 is connected to the first discharge section 6212 of the cooling air intake device 6. This way of connection is provided as an example of embodying the present invention and is not construed to limit the embodiment of the present invention.

With such an arrangement, the external cooling air that is used to cool the continuous variable transmission system of the transmission 4 can flow from the second admission section 6222 of the cooling air intake device 6 through the second discharge section 6223, and after having dust and moisture entraining therewith blocked and trapped in the second intake compartment 622, is conducted by the transmission cooling air ingress conduit 41 into the transmission 4 to carry out a cooling operation on the continuous variable transmission system. The external air, after the cooling operation, is discharged through the transmission cooling air egress conduit 42 on the front side of the transmission 4. As such, the dust and/or moisture entraining the cooling air are prevented from causing damage to the continuous variable transmission system of the transmission 4. The cooling air for cooling the generator 5 flows from the first admission section 612 of the cooling air intake device 6 through the first discharge section 6212, and after having dust and moisture entraining therewith blocked and trapped in the first intake compartment 621, is conducted by the generator cooling air ingress conduit 51 into the generator 5 to carry out a cooling operation. After the cooling operation, the external air is discharged through the generator cooling air egress conduit 52. As such, the dust and/or moisture entraining the cooling air are prevented from causing damage to the generator 5. The dust and/or moisture that are blocked in the second intake compartment 622 is drained through the drain opening 62211 of the second intake compartment 622 into the first intake compartment 621 and then conducted through the channel A of the first intake compartment 621 to the bottom 624. Due the inclined arrangement of the bottom 624, the dust and/or moisture are allowed to discharge from the bottommost portion of the first admission section 612 to outside the vehicle. The dust and/or moisture that are blocked in the first intake compartment 621 are conducted through the channel A of the first intake compartment 621 to the bottom 624. Due to the inclined arrangement of the bottom 624, the dust and/or moisture can be effectively guided to the bottom 624 of the first intake compartment 621 to allow the dust and/or moisture to be discharged outside the vehicle from the bottommost portion of the first admission section 612.

It is also noted that the base plate 61 of the cooling air intake device 6 comprises the blocking section 613 extending along a circumferential flange thereof. The blocking section 613 surrounds the first admission section 612 and the intake box 62 is thus also surrounded by the blocking section 613. In this way, when viewed from a tail side of the vehicle 3, the cooling air intake device 6 completely shields the generator 5 so that ground dust and water that are lifted by the rear wheel RW of the vehicle 3 can be completely blocked by the cooling air intake device 6 and are not allowed to be splash to the generator 5 thereby protecting the generator 5 from be stained by the dust and water lifted by the rear wheel RW.

The efficacy of the present invention is that by providing a cooling air intake device 6 with a first intake compartment 621 and a second intake compartment 622, heat dissipation and cooling can be performed simultaneously on at least two components/sub-assemblies of a vehicle 3 so as to enhance the operation performance of the cooling air intake device 6. Further, by providing a blocking section 613 along a circumferential flange of a base plate 61 of the cooling air intake device 6, when viewed in a direction from the rear side of the vehicle 3 toward the head side, the cooling air intake device 6 can completely shields the generator 5 so that ground dust and water that are lifted by a rear wheel RW of the vehicle 3 can be completely blocked by the cooling air intake device 6 and are not splashed to the generator 5 thereby protecting the generator 5 from being stained and damaged by the dust and water lifted by the rear wheel RW. As such, malfunctioning of the generator 5 caused by staining and damage by dust and water can be prevented.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A cooling air intake device of vehicle, the cooling air intake device being mounted to a frame of the vehicle, the cooling air intake device comprising a base plate and an intake box:
    the intake box being mounted on the base plate, the base plate comprising a first admission section formed therein, the base plate comprising a blocking section adjacent to the first admission section, the intake box comprising a first intake compartment and a second intake compartment, the first intake compartment corresponding to the first admission section of the base plate, the first intake compartment comprising a first baffle plate mounted therein, the first intake compartment having a side wall in which a first discharge section is formed, the second intake compartment being arranged above the first intake compartment in such a way that a second baffle plate is arranged between the first intake compartment and the second intake compartment, the second intake compartment comprising a second admission section and a second discharge section.

2. The cooling air intake device of vehicle according to claim 1, wherein the blocking section of the base plate surrounds the first admission section and the intake box is thus surrounded by the blocking section.

3. The cooling air intake device of vehicle according to claim 1, wherein the first discharge section is connected via a generator cooling air ingress conduit to a generator, the second discharge section being connected via a transmission cooling air ingress conduit to a transmission.

4. The cooling air intake device of vehicle according to claim 1, wherein the first baffle plate is arranged in a downward inclined fashion and the first baffle plate forms a spacing distance from an inside wall of the intake box so that the spacing distance defines a channel.

5. The cooling air intake device of vehicle according to claim 1, wherein the first admission section comprising a plurality of horizontally-extending openings that is distributed in a vertical direction in a mutually-spaced manner.

6. The cooling air intake device of vehicle according to claim 1, wherein the second baffle plate comprises a drain opening, the drain opening being formed with a curved notch.

7. The cooling air intake device of vehicle according to claim 1, wherein the first intake compartment has a bottom that is arranged in an inclined manner.

8. The cooling air intake device of vehicle according to claim 1, wherein the cooling air intake device is mounted to the same side of the frame as a generator.

9. The cooling air intake device of vehicle according to claim 8, wherein the cooling air intake device, when viewed from a rear side of the vehicle toward a head side, completely shields the generator.

10. The cooling air intake device of vehicle according to claim 1, wherein the base plate comprises an intake box mounting section, which has a circumferential flange in which a plurality of mounting holes is formed, the intake box comprising a plurality of securing lugs formed along outer edges facing the base plate in such a way that the securing lugs correspond and oppose the mounting holes of the base plate, whereby the intake box is fixable to the intake box mounting section of the base plate, the blocking section of the base plate comprising a plurality of mounting lugs and mounting holes formed thereon so that the base plate is mountable to the frame by the mounting lugs and the mounting holes of the blocking section.

\* \* \* \* \*